DETECTOR TRACK CIRCUIT APPARATUS

Filed Jan. 29, 1957 2 Sheets-Sheet 1

INVENTOR.
Joseph A. Quinlan.
BY W. L. Stout
HIS ATTORNEY

April 7, 1959 J. A. QUINLAN 2,881,308

DETECTOR TRACK CIRCUIT APPARATUS

Filed Jan. 29, 1957 2 Sheets-Sheet 2

INVENTOR.
Joseph A. Quinlan.
BY
W L. Stout.
HIS ATTORNEY 2,881,308

DETECTOR TRACK CIRCUIT APPARATUS

Joseph A. Quinlan, Greentree, Pa., assignor to Westinghouse Air Brake Company, Wilmerding, Pa., a corporation of Pennsylvania Application January 29, 1957, Serial No. 636,984
6 Claims. (Cl. 246—41)

My invention relates to railway track circuit apparatus, and particularly to a track circuit arrangement in a detector track section at the end of a railway passing siding track where there is an extension of the passing track over a second switch within the detector track section. The track layout therefore resembles a crossover track between two parallel tracks which crossover track is connected to the parallel tracks through a railway track switch at each end.

Heretofore in such a track layout, detection of occupancy of the sections of track over which a route or routes have been aligned by certain positioning of the track switches has been accomplished by use of two or more track circuits. One object of my invention is to provide a single track circuit within the detector track section so arranged as to include all of the rails in the detector section in the track circuit when the track switch to the extension of the passing siding track is aligned for a train movement to the parallel track, and to exclude a section of the rails from the track circuit when this switch is aligned for a train movement to or from the passing siding track extension. Contacts of the track relay in the signal control circuits will therefore reflect track occupancy of the entire detector track section when a route to or from the passing siding is aligned through the track switches, but will reflect track occupancy of only a portion of the detector track, excluding the extension track, when the track switches are aligned for parallel train movements. It is therefore apparent that there is no track circuit control of the signals on the siding and extension tracks when a route is aligned between these signals.

Other objects and characteristic features of my invention will become apparent as the description proceeds.

I shall describe two forms of apparatus embodying my invention, and shall then point out the novel features thereof in claims.

Figure 1:
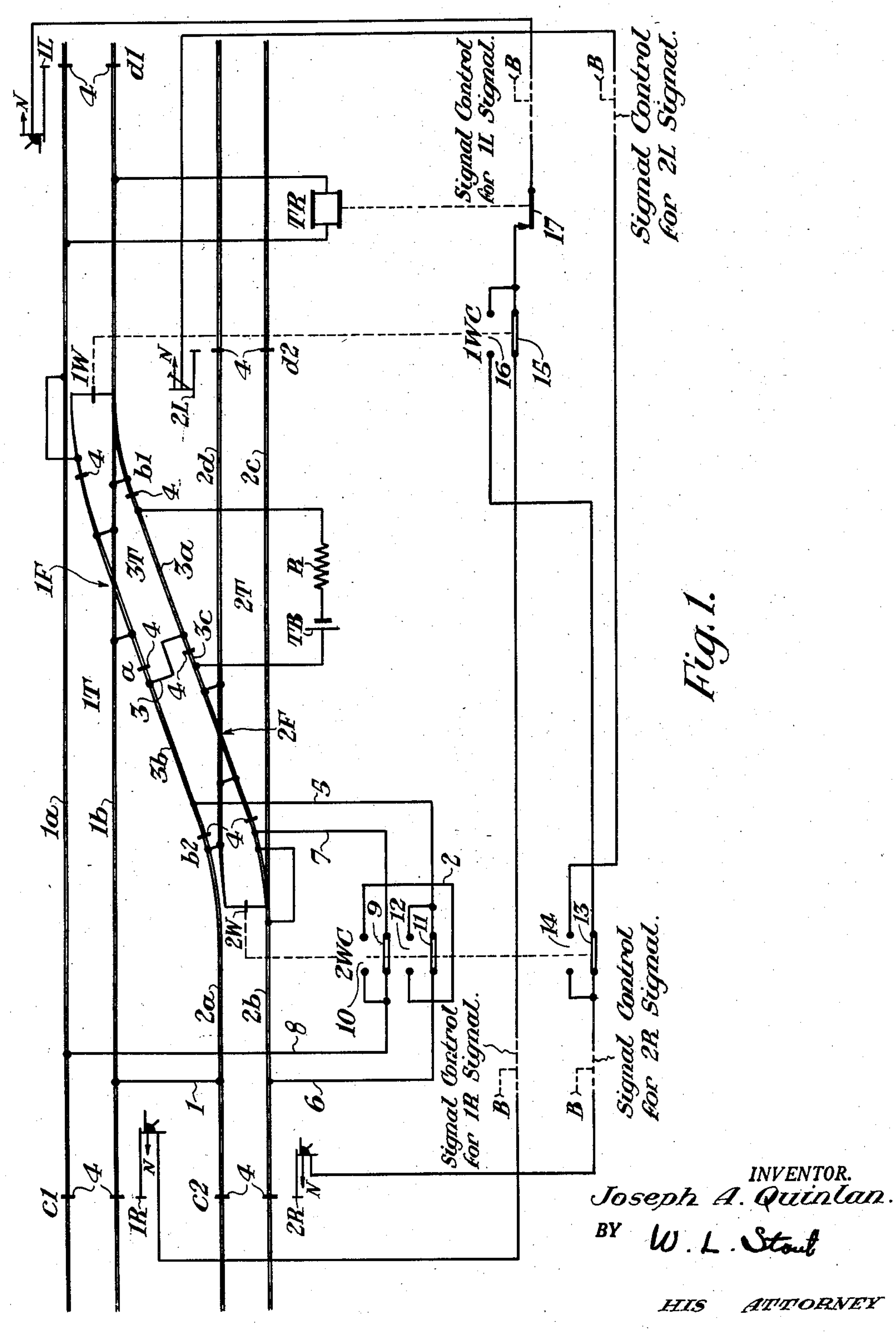

In the accompanying drawings Fig. 1 is a diagrammatic view showing one form of apparatus embodying my invention in which a single track battery and a single track relay are used in a track circuit comprised of the rails of a detector track section at the end of a passing siding including the rails of an extension of the passing siding over a second track switch located in the detector track section. A contact of the track relay is shown used in the signal control circuits to reflect track occupancy in the control of certain signals.

Figure 2:
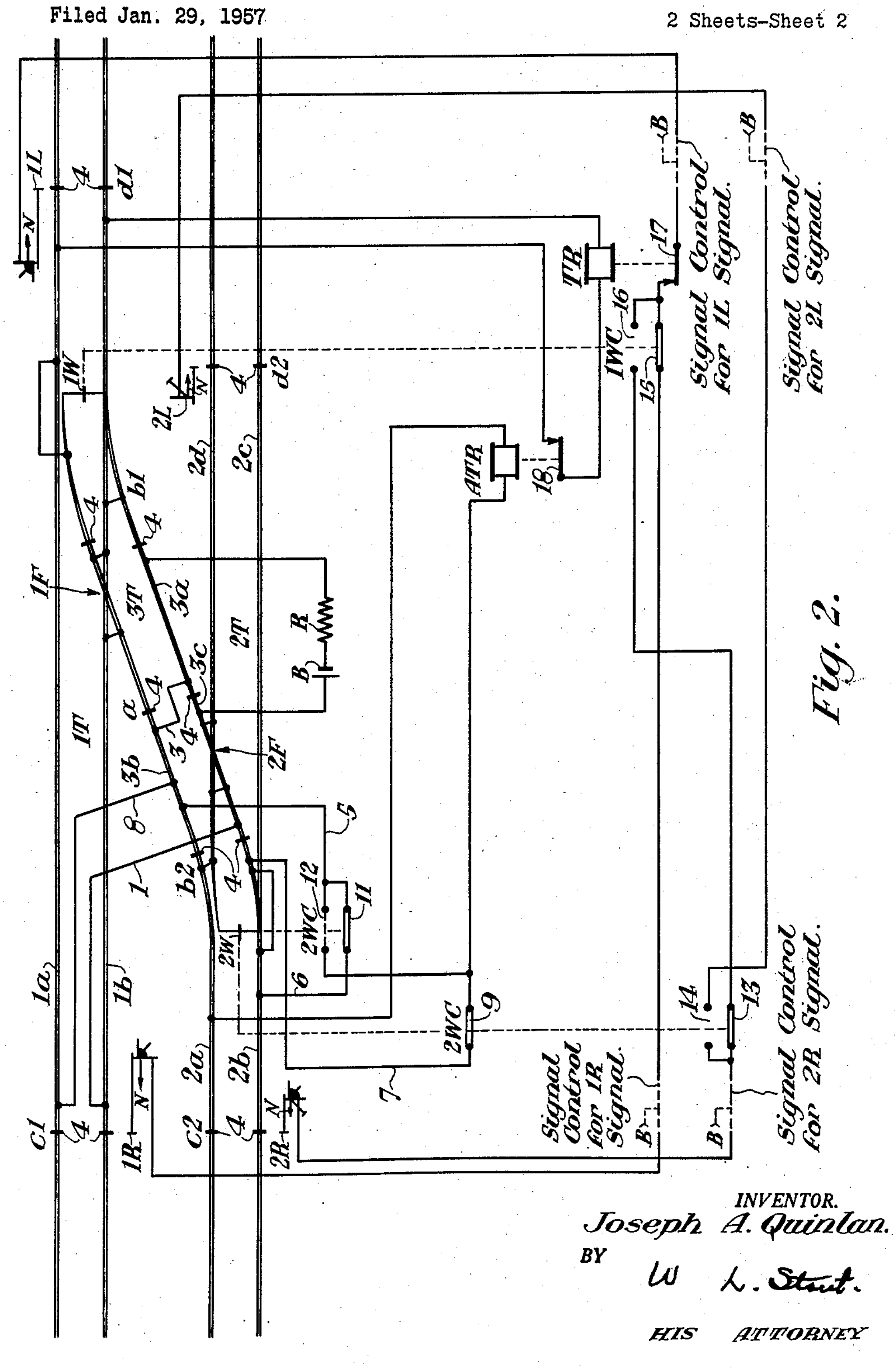

Fig. 2 is a diagrammatic view showing a modified form of the apparatus of Fig. 1 in which two track relays are used with a single track battery in a similar track arrangement. In this view a contact of one of the track relays is also shown used in the signal control circuits to reflect track occupancy in the control of certain signals.

Similar reference characters refer to similar parts in each of the views.

Referring first to Fig. 1, the reference characters 1T and 2T designate two parallel tracks which are connected by a third section of track 3T. Tracks 1T and 3T are connected through a switch 1W which is normally aligned for a train movement along track 1T. Tracks 2T and 3T are connected through a second switch 2W which is normally aligned for a turn out train movement from track 2T to track 1T over track 3T. Switches 1W and 2W operate circuit controllers 1WC and 2WC, respectively.

Track 3T is divided by insulated joints 4 at a mid-point *a* into two sections. The section to the right of point *a*, as shown in the drawings is divided by a pair of insulated joints 4 at the point *b*1 into subsection *a*—*b*1. A section of main track 1T defined by insulated joints 4 at points *c*1 and *d*1 includes track switch 1W and its associated frog 1F.

The section to the left of point *a* as shown in the drawings is divided by a pair of insulated joints 4 at the point *b*2 into subsection *a*—*b*2. A section *c*2—*d*2 of siding extension track 2T, similarly to section *c*1—*d*1, includes track switch 2W and its associated frog 2F.

A railway wayside signal 1R is shown at the left of track 1T to govern train movements to the right in an eastbound direction into that track and a signal 1L is shown at the right end of track 1T to govern train movements to the left in a westward direction into that track. Similarly signals 2R and 2L are shown at the ends of track 2T to govern train movements to the right in an eastward direction and to the left in a westward direction, respectively. It is to be understood that no attempt has been made to show any certain type of railway signal, but that semaphore, searchlight, color light, or any other type may be used without departing from the spirit and scope of my invention.

The signal control circuits have been shown in detail, only to the extent necessary to provide an understanding of my invention. The portions of these circuits represented by the dotted lines in Figs. 1 and 2 cover the remainder of the usual signal control circuits which are well known to anyone versed in the art of railway signaling, and which, for example, may be similar to those shown in Letters Patent of the United States No. 2,567,834, issued September 11, 1951, to Earl M. Allen for Centralized Traffic Control Systems.

It should be pointed out at this time that a suitable source of control current for operation of the signals and any other apparatus other than the track circuits, such as a battery of proper voltage and capacity, is provided, but for the sake of simplicity the power source is not shown in the drawings, its positive and negative terminals being identified by the reference characters B and N respectively.

With switch 2W in the normal position a track circuit including a track relay TR and a track battery TB is formed, which circuit may be traced from battery TB, through the usual track resistor R, rail 3*a* of section *a*—*b*1 of track 3T, wire 3, rail 3*b*, wire 5, normally closed contact 11 of switch circuit controller 2WC, wire 6, rail 2*b* of section *b*2—*c*2 of track 2T, wire 7, normally closed contact 9 of switch circuit controller 2WC, wire 8, rail 1*a* of section *c*1—*d*1 of track 1T, the winding of track relay TR, rail 1*b* of section *c*1—*d*1 of track 1T, wire 1, rail 2*a* of section *b*2—*c*2 of track 2T, and rail 3*c* of section *a*—*b*2 of track 3T, to track battery TB.

It will be seen, therefore, that with switch 2W in the normal position shown, rails 2*c* and 2*d* of section *b*2—*d*2 of track 2T in effect form extensions of rails 2*a* and 2*b* of track 2T, and it is therefore apparent that under these conditions, the entire detector track sections between signals 1L, 1R, 2L and 2R is included in the track circuit.

I will now assume that switch 2W has been moved to the reverse position. Under these conditions rails 2*b* and 2*c* of track 2T are removed from the track circuit, the circuit being from battery TB through resistor R, rail 3*a* of section *a*—*b*1 of track 3T, wire 3, rail 3*b*, wire 5, reverse contact 12 of switch circuit controller 2WC, wire 2, reverse contact 10 of switch circuit controller 2WC, wire 8, rail 1*a* of section *c*1—*d*1 of track 1T, the winding of track relay TR, rail 1*b* of section *c*1—*d*1 of track 1T, wire 1, rail 2*a* of section *b*2—*c*2 of track 2T, and rail 3*c* of section *a*—*b*2 of track 3T, to track battery TB.

Signals 1R, 1L, 2R and 2L are controlled through a signal control network which includes contacts of the switch circuit controllers 1WC and 2WC and a contact of track relay TR, the remainder of the usual signal control network being represented by the dotted portion of the network circuits for purpose of simplicity.

The control for signal 1R can be traced from positive terminal B of the signal control current source (shown in the dotted portion of the network circuits designated as signal control for signal 1L), through these circuits to contact 17 of track relay TR, normally closed contact 15 of switch circuit controller 1WC, dotted portion of circuits designated as signal control for signal 1R, and the winding of the control relay or mechanism for signal 1R to the negative terminal N of the signal control current source. It is therefore apparent that signal 1R cannot be cleared to permit a train movement in the eastward direction into track 1T unless front contact 17 of track relay TR is closed, assuring that the tracks 1T and 3T and, if switch 2W is in the normal position, track 2T is unoccupied by another train, and unless switch 1W is in the normal position.

The control for signal 1L includes two control circuits. The first circuit may be traced from terminal B of the signal control current source (shown in the dotted portion of the signal control network for 1R signal), through normally closed contact 15 of switch circuit controller 1WC, contact 17 of track relay TR, dotted portion of signal control for signal 1L, and the winding of the control relay or mechanism for signal 1L to negative terminal N of the signal control current source. The second circuit is completed when switch 1W is in the reverse position and switch 2W is in the normal position. This circuit may be traced from terminal B of the signal control current source (in the dotted portion of the signal control network shown as signal control for signal 2R) through normally closed contact 13 of switch circuit controller 2WC, reverse contact 16 of switch circuit controller 1WC, contact 17 of track relay TR, dotted portion of signal control for signal 1L and the winding of the control relay or mechanism for signal 1L to the negative terminal N of the signal control current source. Similarly as with signal 1R, it is apparent that signal 1L cannot be cleared for a train movement unless a route through the track switches is aligned, either through switch 1W in the normal position, or through switch 1W in the reverse position and switch 2W in the normal position, and unless front contact 17 of track relay TR is closed assuring that the route aligned is unoccupied by another train.

The control for signal 2R also includes two control circuits, the first being from terminal B of the signal control current source (in dotted portion of network designated as signal control for signal 1L), through contact 17 of track relay TR, reverse contact 16 of switch circuit controller 1WC, normal contact 13 of switch circuit controller 2WC, dotted portion of signal control for signal 2R, the winding of the control relay or mechanism for signal 2R to the negative terminal N of the signal control current source. The second circuit for signal 2R may be traced from the positive terminal B of the signal control current source (in the dotted portion of network shown as signal control for signal 2L), through reverse contact 14 of switch circuit controller 2WC, dotted portion of signal control for signal 2R and the winding of the control relay or mechanism for signal 2R to negative terminal N of the signal control current source.

The control circuit for signal 2L can be traced from positive terminal B of the signal control current source (in the dotted portion of the network circuits designated as signal control for signal 2R), through reverse contact 14 of switch circuit controller 2WC, dotted portion of signal control for signal 2L and the winding of the control relay or mechanism for signal 2L, to negative terminal N of the signal control current source. It is readily apparent that signals 2R and 2L cannot be cleared for train movements unless a route through the track switch or switches has been aligned. However, no contact of track relay TR is included in the control circuits for signals 2R and 2L when switch 2W is in the reverse position.

I will now assume that with switch 2W in the reverse position, switch 1W in the normal position, and signal 2R or 2L cleared for a train movement from one of these signals to the other, a train accepts the cleared signal and enters track 2T. Under these conditions, since the rails 2*b* and 2*c* are now removed from the control of track relay TR as heretofore described, track relay TR remains energized. A simultaneous parallel train movement can therefore be made from signal 1L to signal 1R or from signal 1R to signal 1L over track switch 1W in the normal position.

Referring now to Fig. 2, I have here shown a modification of the apparatus shown in Fig. 1 in which an additional track relay designated ATR is connected in multiple with the track relay TR, both relays being energized from the same track battery TB. In this arrangement the control circuit for track relay TR is independent of track section 2T except for the multiple circuit with track relay ATR.

The control circuit for relay TR may now be traced from battery TB, through the usual track resistor R, rail 3*a* of section *a*—*b*1 of track 3T, wire 3, rail 3*b*, wire 8, rail 1*a* of section *c*1—*d*1 of track 1T, front contact 18 of track relay ATR, the winding of track relay TR, rail 1*b* of section *c*1—*d*1 of track 1T, wire 1, rail 3*c* of section *a*—*b*2 of track 3T, to track battery TB.

The multiple control circuit for track relay ATR may be traced from battery TB through the track resistor R, rail 3*a* of section *a*—*b*1 of track 3T, wire 3, rail 3*b* wire 5, normally closed contact 11 of switch circuit controller 2WC, wire 6, rail 2*b* of section *b*2—*c*2 of track 2T, wire 7, normally closed contact 9 of switch circuit controller 2WC, winding of track relay ATR, rail 2*a* of section *b*2—*c*2 of track 2T, rail 3*c* of section *a*—*b*2 of track 3T to track battery TB. It is therefore, apparent that rails 2*b* and 2*c* are omitted from the control circuit of track relay TR but are now included in the control circuit of track relay ATR.

I will now assume that switch 2W is positioned reverse. Rails 2*b* and 2*c* of track 2T are removed from the control circuit of relay ATR by the opening of contact 11 of switch circuit controller 2WC, these rails thus now become non-circuited, and a direct holding circuit for track relay ATR is established. This control circuit for track relay ATR may be traced from track battery TB, resistor R, rail 3*a*, wire 3, rail 3*b*, wire 5, contact 12 of switch circuit controller 2WC, winding of relay ATR, rail 2*a*, rail 3*c*, to track battery TB. It can be seen that rails 2*b* and 2*c* are removed from the control circuit of track relay ATR when switch 2W is in the reverse position.

Front contact 18 of track relay ATR is included in the control circuit of track relay TR, as heretofore described, so that, when relay ATR is deenergized by occupancy of track section 2T, switch 2W being in the normal position, track relay TR will also be deenergized. From this description it is readily apparent that the circuit arrange-shown in Fig. 2 using two track relays but one track battery will operate in a manner similar to that described for Fig. 1.

The signal control network circuits for the track circuit arrangement shown in Fig. 2 is an exact replica of the signal control circuits of Fig. 1 and the operation of these circuits is exactly the same as that already described for Fig. 1 so that no further description of the operation of these circuits is necessary.

Although I have herein shown and described only two forms of apparatus embodying my invention, it will be understood that various changes and modifications may be made therein within the scope of the appended claims without departing from the spirit and scope of my invention.

Having thus described my invention, what I claim is:

1. In combination, first and second tracks connected by a crossover track including a first track switch in said first track and a second track switch in said second track, a circuit controller connected to said second switch and including a first contact means closed only when the switch is aligned for traffic movements over said second and crossover tracks and second contact means closed only when the switch is aligned for traffic movements over said second track only; and track circuit means including the rails of all three tracks, or the rails of said first and crossover tracks only, according as said first contact means or said second contact means, respectively, are closed.

2. In combination, first and second tracks connected by a crossover track including a first track switch in said first track and a second track switch in said second track, a circuit controller connected to said second switch and including a first and third contact means closed only when the switch is aligned for traffic movements over said second and crossover tracks and second contact means closed only when the switch is aligned for traffic movements over said second track only; track circuit means including the rails of all three tracks, or the rails of said first and crossover tracks only, according as said first contact means or said second contact means, respectively, are closed; and signal control means controlled by said track circuit means only when said third contact means are closed.

3. In a track circuit arrangement for first and second tracks connected by a crossover track through first and second track switches, respectively, having normal and reverse positions, said second track switch being normally aligned to connect the rails of said crossover track to the rails of said second track; in combination; a first set of contacts closed only when said second switch occupies its normal position, a second set of contacts closed only when said second switch occupies its reverse position, and a track circuit comprising a source of current, a track relay, and at times the rails of said three tracks and said first set of contacts, and at other times comprising only the rails of said first and crossover tracks and said second set of contacts.

4. In a track circuit arrangement for first and second tracks connected by a crossover track through first and second track switches, respectively, having normal and reverse positions, said second track switch being normally aligned to connect the rails of said crossover track to the rails of said second track, in combination; a switch circuit controller controlled by said second track switch and having first and second contacts closed and open, respectively, when the switch occupies its normal position, and open and closed, respectively, when the switch occupies its reverse position; and a track circuit including a source of current, a track relay, and the rails of said first track, said crossover track, and said second track, when said first switch circuit controller contacts are closed, and including said source of current, said track relay, and the rails of the first and crossover tracks only, when said second switch circuit controller contacts are closed.

5. In combination, first and second tracks connected by a crossover track through track switches, a source of current, a track relay, means comprising said source of current and said relay connected in series with the rails of said first and crossover tracks to form a first electrical path, a second electrical path comprising the rails of said second track, and contacts controlled by one of said switches for closing said first electrical path or connecting said first electrical path with said second electrical path according as said switch is in a first or second position.

6. In combination, first and second tracks connected by a crossover track including a first track switch in said first track and a second track switch, in said second track, a circuit controller connected to said second switch and including a first contact means closed only when the switch is aligned for traffic movements over said second and crossover tracks and second contact means closed only when the switch is aligned for traffic movements over said second track only; a track circuit comprising a source of current, a track relay, and at times the rails of said three tracks and said first contact means and at other times comprising only the rails of said first and crossover tracks and said second contact means; a signal for governing train movements over said second and crossover tracks, a first signal control circuit for said signal closed when said first contact means is closed and including a contact of said track relay, and a second signal control circuit for said signal closed when said second contact means is closed.

References Cited in the file of this patent

UNITED STATES PATENTS

| | | |
|---|---|---|
| 2,264,533 | Johnston | Dec. 2, 1941 |
| 2,391,985 | Langdon | Jan. 1, 1946 |
| 2,631,227 | Yarbrough | Mar. 10, 1953 |
| 2,745,951 | Derr | May 15, 1956 |